(12) United States Patent
Chatzis

(10) Patent No.: US 8,483,376 B2
(45) Date of Patent: Jul. 9, 2013

(54) VOICE AUDIO PROCESSING METHOD AND DEVICE

(75) Inventor: Konstantinos Chatzis, Patras (GR)

(73) Assignee: Dialog Semiconductor B.V., MV's-Hertogenbosch (NL)

(*) Notice: Subject to any disclaimer, the term of this patent is extended or adjusted under 35 U.S.C. 154(b) by 0 days.

(21) Appl. No.: 13/136,943

(22) Filed: Aug. 15, 2011

(65) Prior Publication Data

US 2012/0039458 A1 Feb. 16, 2012

(30) Foreign Application Priority Data

Aug. 13, 2010 (EP) ................................. 10172728

(51) Int. Cl.
*H04M 3/42* (2006.01)

(52) U.S. Cl.
USPC ............ 379/202.01; 379/203.01; 379/204.01; 379/205.01; 379/206.01; 709/204; 370/260

(58) Field of Classification Search
USPC ....................... 379/202.01–207.03
See application file for complete search history.

(56) References Cited

U.S. PATENT DOCUMENTS 6,178,237 B1 * 1/2001 Horn .................. 379/202.01

FOREIGN PATENT DOCUMENTS

EP 0 680 190 A2 11/1995
WO WO 2008/036834 3/2008

OTHER PUBLICATIONS

"A Versatile Audio Bridge for Multimedia Conferencing," by David N. Horn et al., 1994 IEEE, 0/7803-1825-0/94, pp. 1754-1762.

* cited by examiner

*Primary Examiner* — Joseph J Nguyen
(74) *Attorney, Agent, or Firm* — Saile Ackerman LLC; Stephen B. Ackerman; Rosemary L. S. Pike

(57) ABSTRACT

The invention relates to a method for audio switching and conferencing. The method comprises: providing a plurality of audio channels comprising at least one active audio channel, the active audio channel comprising at least one of an input audio stream and output audio stream; converting the input audio streams from the at least one audio channel in input data; providing audio channel communication requests between parties of the at least one active audio channel; determining a set of Boolean values depending on the parties of the audio channels; determining output data for the respective active audio channels by combining the elements of the Boolean set and the input data; and encoding the output data in output audio streams for the respective active audio channels. In this way an efficient and consistent method for audio switching and conferencing is obtained which reduces complexity of software and/or hardware and enables the number of telephone calls or simultaneous conferences between multiple groups and simple implementation of special functions like eavesdropping and microphone functions.

22 Claims, 3 Drawing Sheets

$$C1 = \begin{pmatrix} 0 1 0 0 0 0 0 0 \\ 1 0 0 0 0 0 0 0 \\ 0 0 0 0 0 0 0 0 \\ 0 0 0 0 0 0 0 0 \\ 0 0 0 0 0 0 0 0 \\ 0 0 0 0 0 0 0 0 \\ 0 0 0 0 0 0 0 0 \\ 0 0 0 0 0 0 0 0 \end{pmatrix} \quad C2 = \begin{pmatrix} 0 1 0 0 0 0 0 0 \\ 1 0 0 0 0 0 0 0 \\ 0 0 0 1 0 0 0 0 \\ 0 0 1 0 0 0 0 0 \\ 0 0 0 0 0 0 0 0 \\ 0 0 0 0 0 0 0 0 \\ 0 0 0 0 0 0 0 0 \\ 0 0 0 0 0 0 0 0 \end{pmatrix} \quad C3 = \begin{pmatrix} 0 1 1 0 0 0 0 0 \\ 1 0 1 0 0 0 0 0 \\ 1 1 0 0 0 0 0 0 \\ 0 0 0 0 0 0 0 0 \\ 0 0 0 0 0 0 0 0 \\ 0 0 0 0 0 0 0 0 \\ 0 0 0 0 0 0 0 0 \\ 0 0 0 0 0 0 0 0 \end{pmatrix}$$

$$C4 = \begin{pmatrix} 0 1 1 0 0 0 0 0 \\ 1 0 1 0 0 0 0 0 \\ 1 1 0 0 0 0 0 0 \\ 0 0 0 0 0 0 0 0 \\ 0 0 0 0 0 0 0 0 \\ 0 0 0 0 0 0 0 0 \\ 0 0 0 0 0 0 0 1 \\ 0 0 0 0 0 0 1 0 \end{pmatrix} \quad C5 = \begin{pmatrix} 0 1 1 0 0 0 0 0 \\ 1 0 1 0 0 0 0 0 \\ 1 1 0 0 0 0 0 0 \\ 0 0 0 0 1 1 0 0 \\ 0 0 0 1 0 1 0 0 \\ 0 0 0 1 1 0 0 0 \\ 0 0 0 0 0 0 0 1 \\ 0 0 0 0 0 0 1 0 \end{pmatrix} \quad C6 = \begin{pmatrix} 0 1 1 1 1 0 0 0 \\ 1 0 1 1 1 0 0 0 \\ 1 1 0 1 1 0 0 0 \\ 1 1 1 0 1 0 0 0 \\ 1 1 1 1 0 0 0 0 \\ 0 0 0 0 0 0 0 0 \\ 0 0 0 0 0 0 0 1 \\ 0 0 0 0 0 0 1 0 \end{pmatrix}$$

$$C7 = \begin{pmatrix} 0 1 1 0 0 0 0 1 \\ 1 0 1 0 0 0 0 1 \\ 1 1 0 0 0 0 0 1 \\ 0 0 0 0 0 0 0 0 \\ 0 0 0 0 0 0 0 0 \\ 0 0 0 0 0 0 0 0 \\ 0 0 0 0 0 0 0 0 \\ 0 0 0 0 0 0 0 0 \end{pmatrix} \quad C8 = \begin{pmatrix} 0 1 0 0 0 0 0 0 \\ 1 0 0 0 0 0 0 0 \\ 0 0 0 0 0 0 0 0 \\ 0 0 0 0 0 0 0 0 \\ 1 1 0 0 0 0 0 0 \\ 1 1 0 0 0 0 0 0 \\ 1 1 0 0 0 0 0 0 \\ 1 1 0 0 0 0 0 0 \end{pmatrix}$$

Fig 4

$$C1 = \begin{pmatrix} 0 & 1 & 0 & 0 & 0 & 0 & 0 & 0 \\ 1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix} \quad C2 = \begin{pmatrix} 0 & 1 & 0 & 0 & 0 & 0 & 0 & 0 \\ 1 & 0 & 0 & 0 & 0 & 0 & 0 & 0 \\ 0 & 0 & 0 & 1 & 0 & 0 & 0 & 0 \\ 0 & 0 & 1 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix} \quad C3 = \begin{pmatrix} 0 & 1 & 1 & 0 & 0 & 0 & 0 & 0 \\ 1 & 0 & 1 & 0 & 0 & 0 & 0 & 0 \\ 1 & 1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix}$$

$$C4 = \begin{pmatrix} 0 & 1 & 1 & 0 & 0 & 0 & 0 & 0 \\ 1 & 0 & 1 & 0 & 0 & 0 & 0 & 0 \\ 1 & 1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 1 & 0 \end{pmatrix} \quad C5 = \begin{pmatrix} 0 & 1 & 1 & 0 & 0 & 0 & 0 & 0 \\ 1 & 0 & 1 & 0 & 0 & 0 & 0 & 0 \\ 1 & 1 & 0 & 0 & 0 & 0 & 0 & 0 \\ 0 & 0 & 0 & 0 & 1 & 1 & 0 & 0 \\ 0 & 0 & 0 & 1 & 0 & 1 & 0 & 0 \\ 0 & 0 & 0 & 1 & 1 & 0 & 0 & 0 \\ 0 & 0 & 0 & 0 & 0 & 0 & 0 & 1 \\ 0 & 0 & 0 & 0 & 0 & 0 & 1 & 0 \end{pmatrix} \quad C6 = \begin{pmatrix} 0 & 1 & 1 & 1 & 1 & 0 & 0 & 0 \\ 1 & 0 & 1 & 1 & 1 & 0 & 0 & 0 \\ 1 & 1 & 0 & 1 & 1 & 0 & 0 & 0 \\ 1 & 1 & 1 & 0 & 1 & 0 & 0 & 0 \\ 1 & 1 & 1 & 1 & 0 & 0 & 0 & 0 \\ 0 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 1 & 0 \end{pmatrix}$$

$$C7 = \begin{pmatrix} 0 & 1 & 1 & 0 & 0 & 0 & 0 & 1 \\ 1 & 0 & 1 & 0 & 0 & 0 & 0 & 1 \\ 1 & 1 & 0 & 0 & 0 & 0 & 0 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix} \quad C8 = \begin{pmatrix} 0 & 1 & 0 & 0 & 0 & 0 & 0 & 0 \\ 1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 1 & 0 & 0 & 0 & 0 & 0 & 0 \\ 1 & 1 & 0 & 0 & 0 & 0 & 0 & 0 \\ 1 & 1 & 0 & 0 & 0 & 0 & 0 & 0 \\ 1 & 1 & 0 & 0 & 0 & 0 & 0 & 0 \end{pmatrix}$$

VOICE AUDIO PROCESSING METHOD AND DEVICE

BACKGROUND OF THE INVENTION (1) Field of Invention

This invention relates to methods and systems, implementing the method, for audio switching and conferencing.

The invention further relates to a device implementing the method.

The invention further relates to a computer program, which is stored on a computer readable storage media, and which is suitable to perform the method according to the first paragraph when it is run on a digital computer.

The inventions further relates to a computer program product directly loadable into the memory of a programmable device, comprising software code portions for performing the steps of a method according to the first paragraph when said product is run on the device.

(2) Prior Art

Ordinary 'in-house telephones' are still commonly used for domestic or corporate purposes. To increase the user-friendliness, these telephones are often cordless telephones, for example according to the Digital Enhanced Cordless Telecommunications ETSI-standard for digital cordless telephones. Such cordless telephone systems comprise a base station and at least one portable handset that is arranged to communicate with the base station, for example via a wireless communication link. FIG. 1 schematically shows a conventional cordless telephone system comprising a base station BS and three portable handsets HS1, HS2, HS3. The handsets HS1,HS2,HS3 comprise a processing unit P1, and have a microphone M1 and a speaker S1 associated with it. The microphone M1 and the speaker S1 may be comprised by the handset HS1, HS2, HS3, but may also one or two remote components arranged to communicate with the processing unit P1 via a wireless or wired communication link (for instance using Bluetooth).

The microphone M1 is arranged to detect sound and transmit a signal representing the detected sound to the processing unit P1. The processing unit P1 is arranged to transmit this signal to the base station BS, for instance via a wireless communication link. The processing arrangement P1 is further arranged to receive a signal from the base station BS and transmit this signal to the speaker S1. The speaker S1 is arranged to generate a sound signal based on the received signal. The handsets HS1,HS2,HS3 may be arranged to carry out all kinds of suitable signal processing steps, such as analogue-to-digital conversion, digital-to-analogue conversion, filtering to increase the quality of the signal, etc. The base station BS may comprise all kinds of hardware and/or software components arranged to receive and transmit signals representing sound from and to the handsets HS1,HS2,HS3. The base station BS is further arranged to communicate with a suitable network NW, e.g. via a line interface LIF, for instance interfacing network NW, which may be the public switched telephone network (PSTN), (asymmetric) digital subscriber line ((A)DSL), integrated services digital network (ISDN). The voice carrier protocol used over these networks may be Voice over IP (VoIP).

A conventional method for audio switching and conferencing for use in such base station exchanges voice data with the external environment via one or more audio channels. An example is voice data exchanged over a public subscriber transmission (PSTN) line, or voice data transmitted through the air for a wireless phone device. Audio Channels are usually bidirectional, for example a PSTN line or unidirectional for example for connecting a speaker or microphone to an audio channel. The bidirectional audio channel has both an input and an output audio stream. The unidirectional audio channel has only one of the two audio streams. Audio channels transfer voice audio data either in raw format or in compressed format. Voice Audio data of the input audio stream can only be processed in a PCM format.

A single bidirectional Audio Channel may correspond to an active conversation between two parties. For operating a bidirectional audio channel the conventional method comprises capturing Audio data from Party HS1,
converting audio data to PCM format data,
processing the PCM format data,
converting the processed PCM format data to an output compression codec and transmitting the compressed data to party HS2.

Data from Party HS2 follow a similar, but opposite route to Party HS1. The conventional method can be extended with a third party HS3 in order to support audio conferencing. In order to host a three-way audio conference for party HS1, HS2 and HS3 the base station is arranged such that party HS1 listens to the added voice of party HS1 and party HS3, party HS2 listens to the added voice of party HS1 and party HS3, and party HS3 listens to the added voice of party HS1 and party HS2. Thereto, a control unit of the base station is adapted to maintain a list of calls and conferences. This list contains multiple entries each containing a participating channel. A digital signal processor of the base station deals with one item of the list at a time. In order to add a new party to the conference or to set up a new connection or conference, the control unit has to extend or refresh the list and to communicate corresponding changes to the digital signal processor. The digital signal processor has to process all the different combinations of the parties of the participating channels and thus the complexity of the computations increases with an increasing number of parties. Furthermore, special functions as for example microphone or eavesdropping has to be implemented separately and increase the complexity even more.

The conventional method may be implemented in a base station which has limited availability of computational resources and which may comprise a multi layer or multi-processor architecture, wherein the voice processing block is implemented in a separate processor or software block.

The conventional method may become increasingly complex as more than three parties are connected and simultaneous conferences between groups of the connected parties have to be established.

SUMMARY OF THE INVENTION

An object of the invention is to provide a method and device for audio switching and conferencing that enables an easy and scalable control interface and simple implementation of special functions.

To achieve this object a first aspect of the invention provides a method for audio switching and conferencing comprising providing a plurality of audio channels comprising at least one active audio channel, the active audio channel comprising at least one of an input audio stream and output audio stream; converting input audio streams from the at least one active audio channels in input data; providing audio channel communication requests between parties of the at least one active audio channel; determining a set of Booleans from the audio communication requests of the at least one active audio channel; determining output data for the respective active audio channels by combining the elements of the Boolean set and the input data; and encoding the output data in output audio streams for the respective active audio channels.

A second aspect of the invention provides a device for audio switching and conferencing comprising an input/output circuit for receiving and/or transmitting a plurality of audio channels comprising at least one active audio channels, the active audio channels comprising at least one of an input audio stream and output audio stream; a decoder for converting the audio streams from the at least one audio channel in input data; an input for receiving audio channel communication requests between parties of the at least one active audio channel; a control unit for determining a set of Booleans from the communication requests of the at least active audio channel; a memory for temporary storage of the set of Booleans, a processor arranged for determining output data for the at least one active audio channels by combining the elements of the Boolean set and the input data of the active audio channels; and an encoder for encoding output data in audio streams for the respective active audio channels.

The method according to a first aspect of the invention may comprise providing a plurality of audio channels comprising at least one active audio channel, the active audio channel comprising at least one of an input audio stream and output audio stream. The input audio streams of the respective active audio channels are converted to input data, for example in a PCM format. Furthermore, a set of Boolean variables is determined from the audio channel communication requests between the parties of the at least active audio channel. This Boolean set enables sharing of information between the control unit, for example a micro controller, and the processor, for example a digital signal processor. The micro controller coordinates the audio channel communication requests and stores and updates the values of this Boolean set in the memory and the digital signal processor retrieves the values of this Boolean set to handle the audio streams accordingly by combining the elements of the Boolean set and input data of the active audio channels. This Boolean set has the same size indifferent of the number of active audio channels and required functionality. The combination of the Boolean set and the input data of the active audio channels is independent of the number of active audio channels and can have an implementation in hardware or software. Therefore, the method provides an efficient and consistent method enabling scalability of the number of telephone calls or a conference between multiple parties or multiple simultaneous groups of parties. Furthermore, this method enables a simple implementation of special functions as, for example, eavesdropping and microphone functions in an easy and consistent way.

In an embodiment of the method the set of Booleans may be arranged as an N×N-dimensional interconnection matrix C wherein N represents the number of audio channels and an element $c(i,j)$ represents a contribution from the i-th input audio stream to the j-th output audio stream which enable use of a matrix multiplication in the processing steps.

In a further embodiment of the method the input data of the audio channels may represented as an N-dimensional input audio vector I wherein an element $I_i$ represents the input data of the i-th input audio stream, the output data is represented in an N-dimensional output vector O wherein an element $O_i$ represents the resulting output data of the i-th output audio stream and the output signal vector O is determined by the matrix product of the interconnection matrix C with the input signal vector I. In this way, a resulting output channel can be calculated as the sum of the input data of the input audio streams for a corresponding value "1" in the column of the corresponding output data stream of the interconnection matrix C.

In a further embodiment of the method the resulting output data may be normalized. For example, by dividing the sum by the number of input audio streams contributing to a output audio stream. In an even further embodiment the number of active audio channels is at least two. In this way simultaneous audio streams can be handled related to simultaneous conferences between respective groups of at least two parties.

In a further embodiment of the method an active audio channel can be uni-directional or bidirectional. In this way eavesdropping and microphone can be realized.

In a further embodiment the active audio may be provided a symmetric or an asymmetric audio channel. In a further embodiment of the method the input data is PCM coded.

Further advantageous embodiments are defined in the dependent claims.

The modules of a voice audio processing method or device, as described above, can be realized in software or hardware or a combination of both software and hardware, as is most appropriate. A voice audio processing device is preferably realized in the form of a computer program product which can be directly loaded into the memory of a programmable device, e.g. an personal computer, a base station etc., and where the steps of the method are performed by suitable software code portions when the computer program is run on the device.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF DRAWINGS

FIG. 3 shows a schematic illustration of the data streams in an audio switching and conference device according to the invention and FIG. 4 shows values of interconnection matrices for establishing different embodiments of the audio switching and conferencing device.

Throughout the figures, like reference signs relate to similar elements, where appropriate.

DETAILED DESCRIPTION OF EMBODIMENTS

Figure 1:
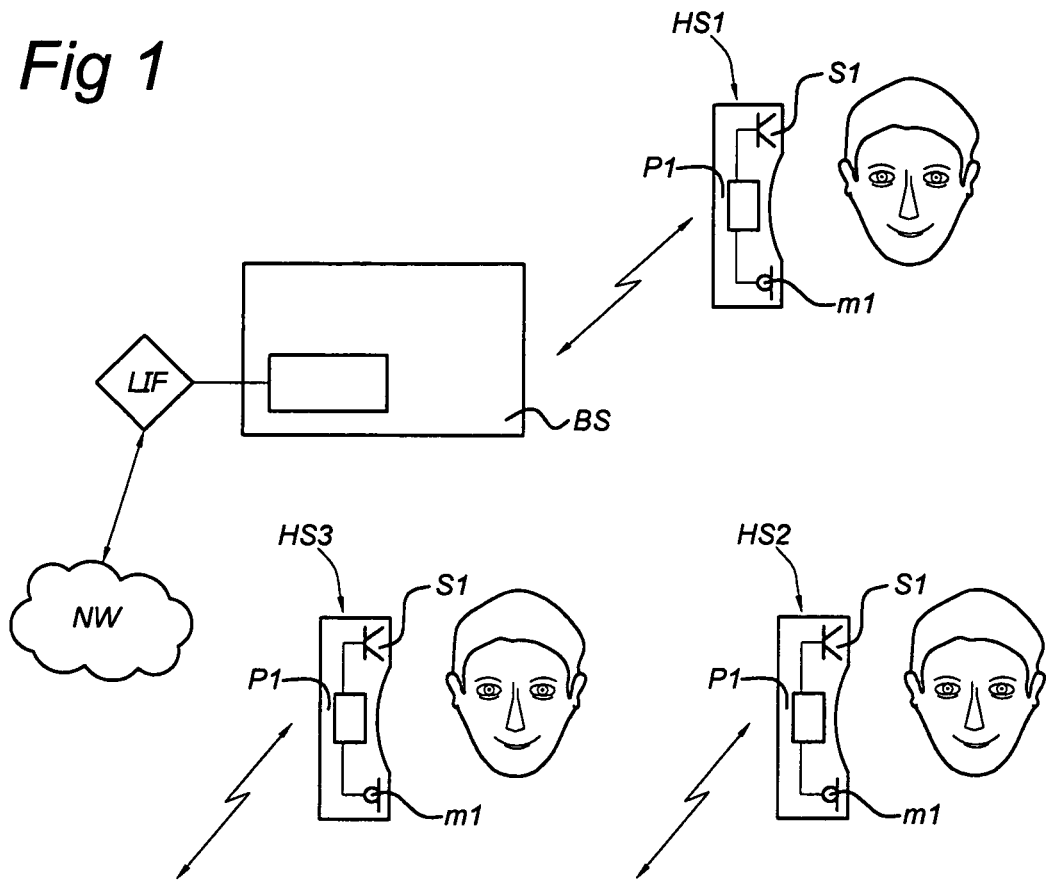
FIG. 1 shows a schematic block diagram of a base station for audio switching and conferencing and related handsets.
Figure 2:
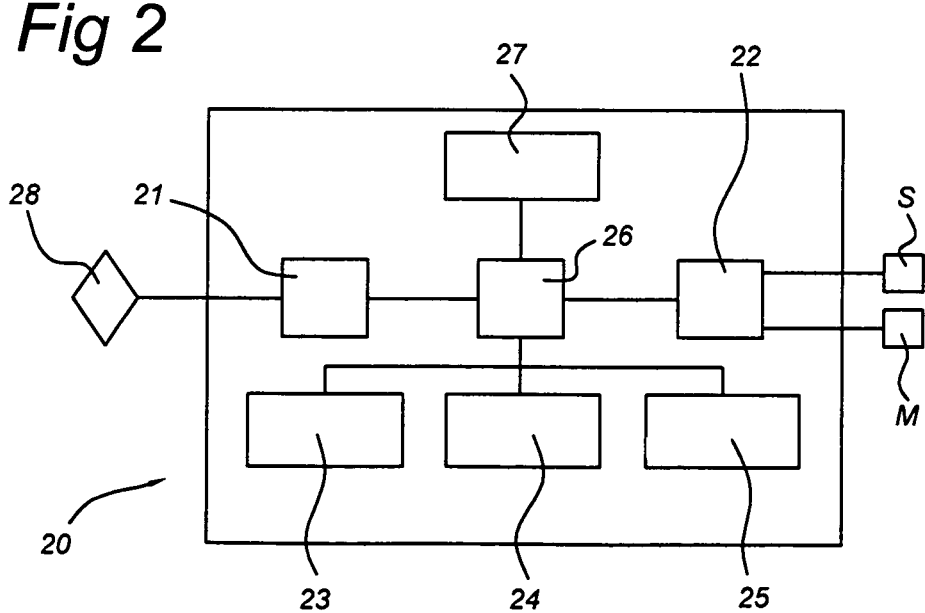
FIG. 2 shows a schematic illustration of a conventional audio switching and conferencing device.

FIG. 2 shows a schematic block diagram of a conventional audio control and conferencing device, for example a base station 20 for audio switching and conferencing and related handsets. The base station 20 comprises a wireless communication processor 27, a processor, for example a digital signal processor 26, a control unit for example a micro controller 23, a line interface 28 and a first coder/decoder device 21 and a second coder/decoder device 22.

In operation, the line interface 28 transfers received signals to the digital signal processor 26 via the first coder/decoder device 21. The first coder/decoder device converts the analog signal in a digital signal and transmits the digital signal to the digital processor 25. The digital signal processor 25 may transmit the received digital signal to the wireless communication processor 27 for transmitting to a handset HS. Alternatively, instead of a line interface 28 other interfaces may be used, depending on the type of network that is interfaced.

Signals transmitted by the handset HS to the base station 20 may transported to the line interface 28 via the wireless communication processor 27, the digital signal processor 26 and the first coder/decoder device 21. The first coder/decoder device 21 converts the digital signal in an analog signal. The micro controller 23 is arranged to control the described actions and to control the digital signal processor 25 for setting up simultaneous communication channels with more than one handset HS by using techniques like frequency division multiple access (FDMA), time division multiple access (TDMA) and time division duplex (TDD).

Often, the base station 20 comprises more functionality and may for instance also be used as a telephone itself. Thereto, the base station 20 comprises a speaker S and a microphone M connected to the digital signal processor 26 via the second coder/decoder device 22. In some cases, where the base station 20 has no line interface 28, the first and second coder/decoder device may be one single coder/decoder device.

In order to set up a connection between two hand sets in a conventional base station, the micro controller 23 sets up audio channels that transfer data either in raw audio, for example a pulse code modulated (PCM) format or in compressed format. In order to send compressed data from the hand set to the other conversation end of the other hand set, the audio or voice data is captured in PCM format and encoded into compressed data according to a known voice compression algorithm or voice codec for example according to a G.711, G.729, GSM-standard. In case of a bidirectional Audio Channel the two Audio Streams can either use the same coder/coder decoder device in the handset, in which case we have a Symmetric Audio Channel, or a different codec per Audio Stream, yielding thus an Asymmetric Audio Channel.

Furthermore, the base station 20 comprises a read-only memory 25 for storage of a control program and a random access memory 24 for temporary storage of operational data. The memory devices 24,25 are accessible by the micro controller 23 as well as the digital signal processor 26.

Figure 3:
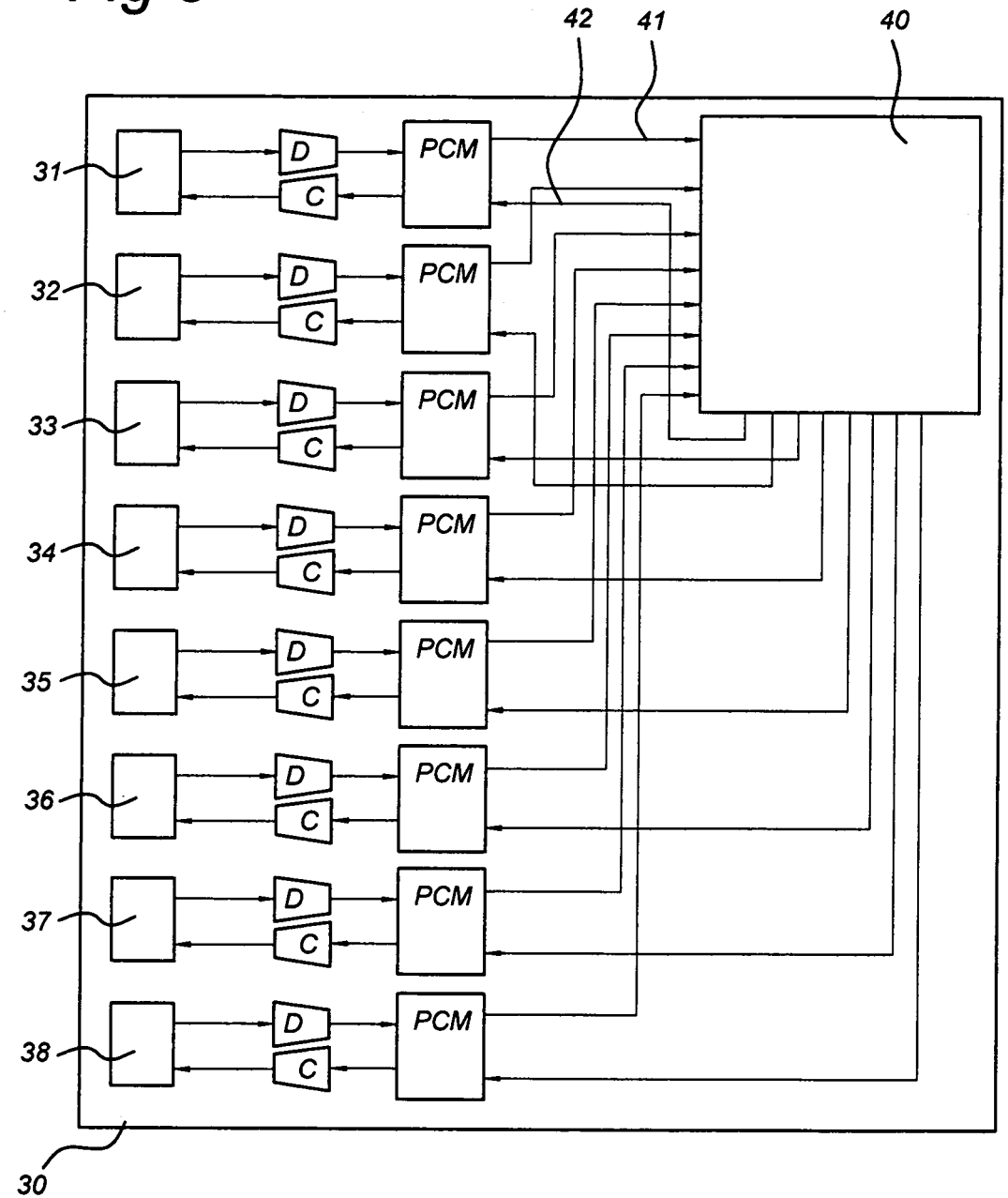

FIG. 3 shows an schematic illustration of the audio streams of an embodiment of an audio switching and conference device according to the invention. In this embodiment, the base station 30 can handle maximally eight active audio channels, for example from respective handsets 31-38. The base station comprises per input a handset 31-38: a decompression unit D, a compression unit C, and a pulse code modulation processing device PCM. The decompression unit D converts compressed data in PCM formatted data. The PCM data is further processed in the PCM processing unit to input data 41. The PCM sends the input data to an interconnection block 40. This interconnection block 40 represents schematically the processing of input data 41 of the input audio stream into output data 42 of the output audio stream as performed by the digital signal processor 26. After the required processing the digital signal processor 26 sends the respective output data to the respective pulse code modulation processing devices PCM. The pulse code modulation processing devices PCM processes the output data in the output audio stream and sends the PCM data to the compression unit C. An arrow 41 → in the FIG. 3 indicates an input data audio stream and an arrow 42 ← indicates an output data audio stream.

In operation, for example for establishing a call between the handsets 31 and 32, one of the handsets 31, 32 submits an audio channel communication requests to base station 20. The micro controller 23 of the base station determines the required contributions of the input audio stream to the output audio stream for the required audio channel communication request and represent that as values of a set of Booleans according to a method known to a person skilled in the art and the stores the values in the random access memory 24.

The determination of the values from the audio channel communication is performed via a higher level protocol that, amongst other steps, refers a dialed number from a calling party to a dial plan that contains connection information of the called party.

In this embodiment of two parties in one communication channel, a value "FALSE" or "0" of the Boolean variable represents an audio channel communication request without a contribution of the input audio stream of the first audio channel V0 to the output audio stream of the second audio channel V1. A value "TRUE" or "1" of the Boolean variable represents an audio channel communication request with a contribution of the input audio stream of the first audio channel V0 to the output audio stream of the second audio channel V1.

This Boolean set can be represented as an 8×8 interconnection matrix C, wherein an element c(i,j) represents the Boolean value relating to a contribution of the i-th input audio stream to j-th output audio stream. A value "TRUE" or "1" represents an audio channel communication request with a contribution of the i-th input channel to the j-th output channel.

The digital signal processer 25 is arranged to determine the output data from the matrix product of the interconnection matrix C and the input data I via $$O=C*I \quad (1)$$

Wherein
O represents a vector whereof an element o(j) represents the output data of the j-th output audio stream,
C represents the interconnection matrix and
I represents a vector whereof an element i(i) represent the input data of the i-th input audio stream.

In an embodiment the digital signal processor 26 is arranged to normalize the output vector O for the number of contributing input data streams to the corresponding output data stream via calculation of $$O=N*(C*I) \quad (2)$$

wherein
O represents a vector whereof an element o(j) represents the output data of the j-th output audio stream,
N represents a normalization vector whereof an element n(i) represents a normalization value given by 1/nf, wherein nf is the number of input audio streams contributing to an output audio stream,
C represents the interconnection matrix and
I represents a vector whereof an element i(i) represent input data of the i-th input audio stream.

The control unit 23 determines for each output audio stream the normalization factor nf from the number of contributing input audio streams and stores the normalization values in the random access memory 24.

The matrix and vector operations can be implemented in a manner known to the skilled person and can be performed in hardware elements or software. The digital signal processor 26 is arranged to execute the operations required to determine the output stream via formula (3) continuously for maintaining the output audio streams wherein the Boolean values and normalization values are retrieved from the random access memory 24.

As these operations are similar for all communication requests irrespective of the required functionality, other types of functionality can now be easily performed. Thereto the control unit 23 updates the Boolean values of interconnection matrix C and the normalization values of the corresponding output audio streams in the random access memory 24 in dependence of the required functionality and audio communication channel request.

This embodiment yields flexibility in supporting multiple conferencing and simple audio connections which may use a single configuration interface and a fixed, unified voice processing behavior.

Examples of possible functions that can be performed by this embodiment can now be related to the values of the respective interconnection matrices C1-C8 as shown in FIG. 4.

FIG. 4 shows:

the values of interconnection matrix C1 for establishing a bidirectional audio channel between two parties V0 and V1;

the values of an interconnection matrix C2 for establishing two bidirectional audio channels between part V0 and party V1, and party V2 and party V3 respectively;

The values of an interconnection matrix C3 for establishing a three-way conference between parties V0,V1,V2 respectively;

The values of an interconnection matrix C4 for establishing a three-way conference between parties V0,V1,V2 respectively and an independent audio channel between parties V6 and W.

The values of interconnection matrix C5 for establishing a first three-way conference between parties V0,V1 and V3, a second three-way conference between parties V3,V4 and V5 respectively and an independent audio channel between parties V6 and V7.

The values of an interconnection matrix C6 for establishing a five-way conference between parties V1,V2,V3,V4 and V5 and an independent audio channel between parties V6 and V7.

In the embodiments described so far the Boolean values determined for the required communication channels lead to symmetric matrix C for which $C=C^T$ holds.

Also embodiments which lead to an asymmetric matrix C for which $C \neq C^T$ holds, are possible, for example for eavesdropping and microphone functions.

FIG. 4 furthermore shows:

The values of an interconnection matrix C7 for establishing a three-way conference between parties V0, V1 and V2 and an eavesdropping channel for party

V7. In this embodiment party V7 listens to the three-way conference between parties V0,V1 and V2, but cannot be heard by those parties;

The values of an interconnection matrix C8 for establishing an audio channel between parties V0 and V1, and four microphone parties V4,V5,V6 and V7 respectively.

The invention may be implemented by means of hardware comprising several distinct elements, and by means of a suitably programmed computer. In the device claim enumerating several means, several of these means may be embodied by one and the same item of hardware. The mere fact that Certain measures are recited in mutually different dependent claims does not indicate that a combination of these measures cannot be used to advantage.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

While the invention has been particularly shown and described with reference to the preferred embodiments thereof, it will be understood by those skilled in the art that various changes in form and details may be made without departing from the spirit and scope of the invention.

What is claimed is:

1. A method for audio switching and conferencing comprising:
    providing a plurality of audio channels comprising at least one active audio channels, the active audio channel comprising at least one of an input audio stream and output audio stream;
    converting the input audio streams from the at least one audio channel in input data;
    providing audio channel communication requests between parties of the at least one active audio channel;
    determining a set of Boolean values depending on the communication requests of parties of the audio channels;
    determining output data for the respective active audio channels by combining the elements of the Boolean set and the input data wherein the set of Booleans is arranged as an N×N-dimensional interconnection matrix C wherein N represents the number of audio channels and an element $c(i,j)$ represents a contribution from the i-th input audio stream to the j-th output audio stream; and
    encoding the output data in output audio streams for the respective active audio channels.

2. Method according to claim 1 wherein the input data is represented as an N-dimensional input audio vector I wherein an element Ii represents the input data corresponding to the i-th input audio stream, the output data is represented in an N-dimensional output vector O wherein an element Oi represents the resulting output data corresponding to the i-th output audio stream and the output vector O is determined by the matrix product of the interconnection matrix C with the input signal vector I.

3. Method according to claim 2 wherein the resulting output data corresponding to the i-th output audio stream is normalized.

4. Method according to claim 2 wherein the active audio channel comprises a symmetric audio channel.

5. Method according to claim 1 wherein the number of active audio channels is at least two.

6. Method according to claim 5 comprising handling the audio streams of two simultaneous conferences.

7. Method according to claim 1 wherein one of the active audio channels is bidirectional.

8. Method according to claim 1 wherein one of the active audio channel is unidirectional.

9. Method according to claim 1 wherein the active audio channel comprises an asymmetric audio channel.

10. Method according to claim 1 wherein the input data is PCM coded.

11. A device for audio switching and conferencing comprising:
    an input/output circuit for receiving or transmitting, or both, a plurality of audio channels comprising at least one active audio channels, the active audio channels comprising at least one of an input audio stream and output audio stream;
    a decoder for converting the input audio stream from the respective active audio channels in input data;
    an input for receiving audio channel communication requests between parties of the active audio channels;
    a control unit for determining a set of Booleans depending on the communication requests of parties of the active audio channels;
    a memory for temporary storage of the set of Booleans, a processor arranged for determining output data for the respective active audio channels by combining the elements of the Boolean set and the input data of the active audio channels wherein the set of Booleans is arranged as an N×N-dimensional interconnection matrix C wherein N represents the number of audio channels and an element c(i,j) represents a contribution from the i-th input audio stream to the j-th output audio stream; and an encoder for encoding output data in audio streams for the respective active audio channels.

12. A computer program product comprising data and instructions, said computer program being arranged to be loaded by a system for audio switching and conferencing and stored on a tangible medium, and after being loaded providing a micro controller with the capacity to perform the steps comprising: converting the input audio streams from the at least one audio channel in input data;

providing audio channel communication requests between parties of the at least one active audio channel;

determining a set of Boolean values depending on the communication requests of parties of the audio channels;

determining output data for the respective active audio channels by combining the elements of the Boolean set and the input data ; and encoding the output data in output audio streams for the respective active audio channels, wherein the set of Booleans is arranged as an N×N-dimensional interconnection matrix C wherein N represents the number of audio channels and an element c(i,j) represents a contribution from the i-th input audio stream to the j-th output audio stream.

13. The computer program of claim 12 wherein the resulting output data corresponding to the i-the output audio stream is normalized.

14. The computer program of claim 12 wherein the number of active audio channels is at least two.

15. The computer program of claim 14 comprising handling the audio streams of two simultaneous conferences.

16. The computer program of claim 12 wherein the input data is PCM coded.

17. The computer program of claim 12 wherein the input data is represented as an N-dimensional input audio vector I wherein an element Ii represents the input data corresponding to the i-th input audio stream, the output data is represented in an N-dimensional output vector O wherein an element Oi represents the resulting output data corresponding to the i-th output audio stream and the output vector O is determined by the matrix product of the interconnection matrix C with the input signal vector I.

18. The computer program of claim 12 wherein the resulting output data corresponding to the i-the output audio stream is normalized.

19. The computer program of claim 12 wherein the number of active audio channels is at least two.

20. The computer program of claim 18 comprising handling the audio streams of two simultaneous conferences.

21. The computer program of claim 12 wherein the input data is PCM coded.

22. A method for audio switching and conferencing comprising: providing a plurality of audio channels comprising at least one active audio channel, the active audio channel comprising at least one of an input audio stream and output audio stream;

converting the input audio streams from the at least one audio channel in input data;

providing audio channel communication requests between parties of the at least one active audio channel;

determining a set of Boolean values depending on the communication requests of parties of the audio channels;

determining output data for the respective active audio channels by combining the elements of the Boolean set and the input data wherein the set of Booleans is arranged as an N×N-dimensional interconnection matrix C wherein N represents the number of audio channels and an element c(i,j) represents a contribution from the i-th input audio stream to the j-th output audio stream; and encoding the output data in output audio streams for the respective active audio channels.

* * * * *